(12) United States Patent
Barkan et al.

(10) Patent No.: US 10,825,072 B2
(45) Date of Patent: Nov. 3, 2020

(54) SYSTEM FOR PRODUCING RECOMMENDATIONS AND PREDICTING PURCHASES OF PRODUCTS BASED ON USAGE PATTERNS

(71) Applicant: Microsoft Technology Licensing, LLC, Redmond, WA (US)

(72) Inventors: Oren Barkan, Tel Aviv (IL); Yael Brumer, Herzilyah (IL); Noam Koenigstein, Tel Aviv (IL); Ilona Kifer, Lehavot Haviva (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 901 days.

(21) Appl. No.: 15/432,595

(22) Filed: Feb. 14, 2017

(65) Prior Publication Data

US 2018/0075516 A1 Mar. 15, 2018

Related U.S. Application Data

(60) Provisional application No. 62/394,553, filed on Sep. 14, 2016.

(51) Int. Cl.
| | | |
|---|---|---|
| *G06Q 30/06* | (2012.01) | |
| *G06Q 10/06* | (2012.01) | |
| *G06F 17/18* | (2006.01) | |
| *G06F 16/00* | (2019.01) | |
| *G06N 3/04* | (2006.01) | |

(52) U.S. Cl.
CPC ......... *G06Q 30/0631* (2013.01); *G06F 16/00* (2019.01); *G06F 17/18* (2013.01); *G06N 3/0472* (2013.01); *G06Q 10/067* (2013.01)

(58) Field of Classification Search
CPC .. G06Q 30/0631; G06Q 10/067; G06F 17/18; G06F 16/00; G06N 3/0472
See application file for complete search history.

(56) References Cited

U.S. PATENT DOCUMENTS

| | | |
|---|---|---|
| 7,113,917 B2 | 9/2006 | Jacobi et al. |
| 7,318,056 B2 | 1/2008 | Taniguchi et al. |
| 7,720,723 B2 | 5/2010 | Dicker et al. |

(Continued)

OTHER PUBLICATIONS

Vieira, Armando, "Predicting online user behaviour using deep learning algorithms", In Proceedings of the Computing research Repository, Nov. 2015, pp. 1-21.

(Continued)

*Primary Examiner* — Scott L Jarrett
(74) *Attorney, Agent, or Firm* — Alleman Hall Creasman & Tuttle LLP

(57) ABSTRACT

Aspects disclosed herein may utilize neural embedding techniques to model session activity. A dataset may be collected from on online market place, such as an app store. The data set may include one or more user sessions comprising sequential click actions and/or item purchases. Models may be generated to represent session activity and, therefore, may be utilized for contextual recommendations of apps in an online app store. As such, the various aspects disclosed herein may also generate purchase predictions based on click-purchase relations in a sequence. The item similarities and purchase predictions may be used to provide real-time aid to users navigating an online marketplace.

12 Claims, 8 Drawing Sheets

(56) References Cited

U.S. PATENT DOCUMENTS

| | | | |
|---|---|---|---|
| 7,860,870 | B2 | 12/2010 | Sadagopan et al. |
| 8,326,658 | B1 | 12/2012 | Lee et al. |
| 9,691,096 | B1* | 6/2017 | Dai ................... G06Q 30/0631 |
| 10,346,856 | B1* | 7/2019 | Kohli ................... G06N 7/005 |
| 10,592,956 | B2* | 3/2020 | Hu ..................... G06Q 30/0631 |
| 10,650,432 | B1* | 5/2020 | Joseph ..................... G06N 3/08 |
| 2010/0064040 | A1 | 3/2010 | Wise et al. |
| 2011/0251976 | A1* | 10/2011 | Thathachar ............ G06F 17/16 705/36 R |
| 2012/0130940 | A1* | 5/2012 | Gattani ............. G06Q 30/0631 707/600 |
| 2013/0346234 | A1* | 12/2013 | Hendrick .......... G06Q 30/0631 705/26.7 |
| 2014/0172627 | A1 | 6/2014 | Levy et al. |
| 2014/0207622 | A1 | 7/2014 | Vijayaraghavan et al. |
| 2015/0269609 | A1* | 9/2015 | Mehanian .......... G06Q 30/0246 705/14.45 |
| 2015/0356601 | A1 | 12/2015 | Lu |
| 2017/0316486 | A1* | 11/2017 | Barkan ............... G06F 16/2465 |

OTHER PUBLICATIONS

"Using Machine Learning on Compute Engine to Make Product Recommendations", Retrieved on: Aug. 5, 2016 Available at: https://cloud.google.com/solutions/recommendations-using-machine-learning-on-compute-engine.

Margalit, Liraz, "Past Behavior Does Not Determine Future Purchases", Published on: Oct. 24, 2015 Available at: https://techcrunch.com/2015/10/24/past-behavior-does-not-determine-future-purchases/.

Davenport, et al., "Know What Your Customers Want before They Do", Published on: Dec. 2011 Available at: https://hbr.org/2011/12/know-what-your-customers-want-before-they-do.

Krizhevsky, et al., "ImageNet Classification with Deep Convolutional Neural Networks", In Proceedings of 26th Annual Conference on Neural Information Processing Systems, Dec. 3, 2012, pp. 1-9.

Graves, et al., "Speech Recognition with Deep Recurrent Neural Networks", In Proceedings of IEEE International Conference on Acoustics, Speech and Signal Processing, May 26, 2013, 5 pages.

Bengio, et al., "A Neural Probabilistic Language Model", In Journal of Machine Learning Research, vol. 3, Feb. 2003, pp. 1137-1155.

Yih, et al., "Learning Discriminative Projections for Text Similarity Measures", In Proceedings of Fifteenth Conference on Computational Natural Language Learning, Jun. 23, 2011, 10 pages.

Mikolov, et al., "Distributed Representations of Words and Phrases and their Compositionality", In Proceedings of 27th Annual Conference on Neural Information Processing Systems, Dec. 5, 2013, pp. 1-9.

Collobert, et al., "Natural Language Processing (Almost) from Scratch", In Journal of Machine Learning Research, vol. 12, Aug. 2011, pp. 2493-2537.

Kim, Yoon, "Convolutional Neural Networks for Sentence Classification", In Proceedings of Conference on Empirical Methods in Natural Language Processing, Oct. 25, 2014, pp. 1746-1751.

Koren, et al., "Matrix Factorization Techniques for Recommender Systems", In Journal of Computer, vol. 42, Issue 8, Aug. 2009, pp. 42-49.

Bennett, et al., "The Netflix Prize", In Proceedings of KDD Cup Workshop, Aug. 12, 2007, pp. 3-6.

Bell, et al., "Lessons from the Netflix Prize Challenge", In ACM SIGKDD Explorations Newsletter, vol. 9, Issue 2, Dec. 2007, pp. 75-79.

Dror, et al., "The Yahoo! Music Dataset and KDD-Cup 11", In Proceedings of KDD Cup Workshop, Aug. 21, 2011, pp. 3-18.

Barkan, et al., "Item2Vec: Neural Item Embedding for Collaborative Filtering", In Journal of Computing Research Repository, Mar. 2016, pp. 1-8.

Maaten, et al., "Visualizing Data using t-SNE", In Journal of Machine Learning Research, Nov. 2008, pp. 2579-2605.

Chelba, et al., "One Billion Word Benchmark for Measuring Progress in Statistical Language Modeling", In Proceedings of Computing Research Repository, Dec. 2003, 6 pages.

Csurka, et al., "Visual Categorization with Bags of Keypoints", In Proceedings of 8th European Conference on Computer Vision, May 11, 2004, 16 pages.

Ramos, Juan, "Using TF-IDF to Determine Word Relevance in Document Queries", In Proceedings of First Instructional Conference on Machine Learning, Dec. 3, 2003, 4 pages.

Kingma, et al., "Adam: A method for stochastic optimization", In Proceedings of Computing Research Repository, Dec. 2014, pp. 1-15.

Harper, et al., "The MovieLens Datasets: History and Context", In Journal of ACM Transactions on Interactive Intelligent Systems, vol. 5, Issue 4, Jan. 2016, 20 pages.

Prechelt, Lutz, "Automatic Early Stopping Using Cross Validation: Quantifying the Criteria", In Journal of Neural Networks, vol. 11, Issue 4, Jun. 1998, pp. 1-12.

Strub, et al., "Hybrid Collaborative Filtering with Neural Networks", In Proceedings of Computing Research Repository, Mar. 2016, 10 pages.

Wan, et al., "Next Basket Recommendation with Neural Networks", In Proceedings of 9th ACM Conference on Recommender Systems, Sep. 16, 2015, 2 pages.

Zhang, et al., "Large Scale Purchase Prediction with Historical User Actions on B2C Online Retail Platform", In Proceedings of Computing Research Repository, Aug. 2014, 4 pages.

Wu, et al., "Neural Modeling of Buying Behaviour for E-Commerce from Clicking Patterns", In Proceedings of the International ACM Recommender Systems Challenge, Sep. 16, 2015, 4 pages.

\* cited by examiner

SYSTEM FOR PRODUCING RECOMMENDATIONS AND PREDICTING PURCHASES OF PRODUCTS BASED ON USAGE PATTERNS

RELATED APPLICATIONS

This application claims priority to U.S. Provisional Patent Application No. 62/394,553, entitled "System for Producing Recommendations and Predicting Purchases of Products based on Usage Patterns," filed on Sep. 14, 2016, which is hereby incorporated by reference in its entirety.

BACKGROUND

Neural networks have been applied in collaborative filtering and basket completion. Most prominent collaborative filtering techniques, however, do not take into account the sequential order of user actions prior to purchasing an item. It is with respect to these and other general considerations that embodiments have been described. Also, although relatively specific problems have been discussed, it should be understood that the embodiments should not be limited to solving the specific problems identified in the background.

SUMMARY

Aspects disclosed herein may utilize neural embedding techniques to model session activity. A dataset may be collected from on online marketplace, such as an app store. The data set may include one or more user sessions comprising sequential click actions and/or item purchases. Models may be generated to represent session activity and, therefore, may be utilized for contextual recommendations of apps in an online app store. The aspects disclosed herein may be employed to provided recommendations based upon a sequence of actions. As one example, aspects disclosed herein may generate item similarities. The item similarities and purchase predictions may be used to provide real-time aid to users navigating an online marketplace.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
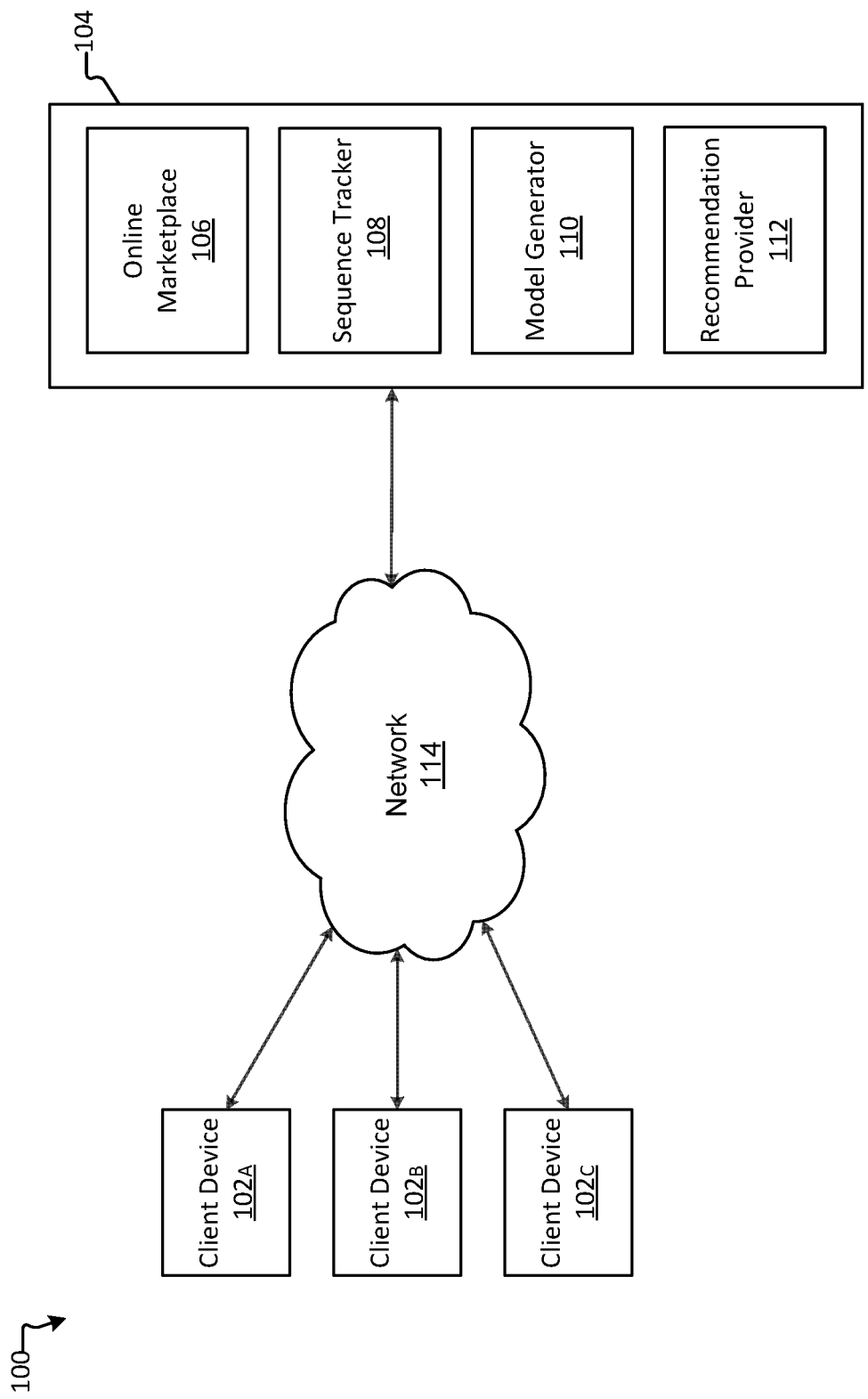
FIG. 1 depicts an exemplary system that may be employed to provide recommendations.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Aspects of the present disclosure relate to systems and methods for using neural embedding techniques to model session activity. For ease of illustration, the aspects disclosed herein are described with respect to click and purchase actions for an online market place such as an application store. However, one of skill in the art will appreciate that the various aspects disclosed herein may be employed to generate recommendations for other types of environments without departing from the spirit or scope of this disclosure. The aspects disclosed herein may be employed to provided recommendations based upon a sequence of actions. As one example, aspects disclosed herein may generate item similarities based on click and purchase patterns for one or more uses. Similar items identified by the aspects disclosed herein may be provided as a recommendation to a user during a user session. The various aspects disclosed herein may also generate purchase predictions based on click-purchase relations in a sequence. The item similarities and purchase predictions may be used to provide real-time aid to users navigating an online marketplace. Additionally, the models described herein may be analyzed in order to optimize the layout and/or linking of content items for an online marketplace.

Aspects disclosed herein may utilize neural embedding techniques to model session activity. A dataset may be collected from on online market place, such as an app store. The data set may include one or more user sessions comprising sequential click actions and/or item purchases. Models may be generated to represent session activity and, therefore, may be utilized for contextual recommendations of apps in an online app store. Most prominent collaborative filtering (CF) techniques do not take into account the sequential order of actions. For example, most collaborative filtering technique fails to account for sequential click actions that occur prior to the purchase of an item in an online marketplace. Aspects of the present disclosure, however, consider several items prior to their ultimate decision to purchase. Hence, session activity may be modeled as a sequence of click events on item detail pages and purchase events. For example, the set {C1, C2, C3, C4, C5, P5} denotes a session consisting of five click event on five different items (e.g., click events C1-C5) followed by a single purchase event (e.g., P5). In most cases, an item purchase event is preceded by a click event on the same item. By learning to predict these sequences, the aspects disclosed herein may be leveraged to improve an overall user experience by recommending the items that the user is most likely to purchase based upon a sequence of actions performed by the user.

FIG. 1 depicts an exemplary system 100 that may be employed by the various aspects disclosed herein. System 100 comprises various different client devices, that is, client devices 102A, 102B, and 102C, that interact with an online marketplace 106 via a network 114. Client device 102A-C may be a laptop, a tablet, a smartphone, a game console, or any other computing device capable of communicating with other devices via a network. Network 114 may be any type of communication network, such as, for example, a local area network (LAN), a wide area network (WAN), a cellular data network, a fiber optics data network, the Internet, and the like. Online marketplace 106 may be hosted by one or more server computing devices. In one aspect, online marketplace 106 may be hosted by a single server computing device. In alternate aspects, online marketplace 106 may be hosted by a plurality of computing devices in a distributed network 104. The distributed network 104 may host other services such as a sequence tracker 107, a model generator 110, and a recommendation provider 112. A client device, such as client device 102A, interacts with the online marketplace 106 to browse and/or purchase available content items. The interaction may take the form of a number of different actions. A first type action may be a click action. A click action is an action that occurs when a client device receives input indicative of a selection of an item residing in the online marketplace 106. In one example, selection of an item may comprise a user clicking on a specific content item in the online marketplace 106. Alternatively, the item may be selected via a query submitted by a client device, such as client device 106. A second type of action may be a purchase action. A purchase action occurs when a content item is purchased from the online marketplace 106.

Sequence tracker 108 may monitor and store data associated with various actions. A sequence of click actions and/or purchase actions may be grouped into a session. A session may consist of a sequence of click or purchase actions associated with a client device. Client device 102A, 102B, and 102C may each have one or more associated sessions. Sequence tracker 108 may associate sessions with a client device that performed the sequence of actions, with a user profile associated with the client device or a user performing the sequence of actions, and/or with one or more content items stored on the online marketplace 106. In one aspect, sequence tracker 108 may store a series of actions into a single session. For example, the set {C1, C2, C3, C4, C5, P5} which represents five click event on five different items followed by a single purchase action may be stored as a session by sequence tracker 108. In further aspects, additional metadata associated with each action may also be stored by the sequence tracker 108. Exemplary additional metadata may include information about the content item that is the target of the action, the time the action was performed, the amount of time the elapsed between the last action and the current action, user specific information, historical information related to an associated user or content item, and the like.

Model generator 108 may operate on the one or more sequences captured by the sequence tracker 108 in order to generate one or more models to represent sequences of actions. In one aspect, a model generated the model generator 108 using an item2vec algorithm. The item2vec algorithm is a variant of the Skip-Gram with Negative Sampling (SGNS) also known as Word2vec. While specific modeling algorithms are described herein, one of skill in the art will appreciate that other types of models may be employed without departing from the spirit of this disclosure.

Item2vec may be employed to model actions in a dataset $\mathcal{D}=\{s_i\}_{i=1}^{K}$ of K ordered user activity sequences where the i'th sequence is $s_i=(a_{i,1}, a_{i,2}, \ldots, a_{i,L_i})$, and $L_i$ is its length. The set of all possible actions is denoted by $\mathcal{A}$ and includes in our case click and purchase events of different items from the items catalog. We further define a function A: $\mathcal{A} \to \{C, P\}$ that maps between an action to its type (click or purchase). The objective is to maximize the following term:

$$\frac{1}{K}\sum_{i=1}^{K} \sum_{(k,j)\in I_i} \log p(a_{i,k} | a_{i,j}) \quad (1)$$

In the above equation, $I_i \subseteq \{(k,j): 0 \le j < k \le L_i\}$ is a set that contains (target, context) tuples of sequential actions. The probability $p(a_{i,k}|a_{i,j})$ is defined by:

$$p(a_{i,k} | a_{i,j}) = \sigma(u_{a_{i,j}}^T v_{a_{i,k}}) \prod_{n=1}^{N} \sigma(-u_{a_{i,j}}^T v_{a_n})$$

In the probability equation $\sigma(x)=1/1+\exp(-x)$, and $u_a \in U(\subset \mathbb{R}^m)$ and $v_a \in V(\subset \mathbb{R}^m)$ are latent vectors corresponding to the target and context representation of action a. The parameter m is chosen empirically through cross-validation. N is a parameter that determines the number of negative examples to be drawn per a positive example. A negative action a is sampled from a distribution that is proportional to the frequency of the item that is associated with a. A unigram distribution raised to the ¾rd power may be employed in order to provide better results.

In order to mitigate the effect of popularity and produce better modeling for unpopular items, the sessions may be subsampled. For example, actions related to a content item may be disproportionately represented in a collection of sessions. In order to account for this, the collection of sessions may be subsampled to provide a proper representation over a period of time. In various aspects, actions a with the probability $p(\text{discard}|a)=1-\sqrt{p/f(y(a))}$ may be discarded, where y(a) is the item that is associated with the action a, f(x) is the frequency of the item x and ρ is a parameter that controls how aggressive is the subsampling. Finally, the latent vectors are estimated by applying a stochastic gradient ascent with respect to the objective in Eq. (1).

Variations of models may be created by the model generator 108. The variants may differ by the tuples that the model is trained with. The set of tuples for each models is determined by the choice of $I_i$ in Eq. (1).

The first model may be sued to model a sequence of click actions followed by a purchase action. The first model may be comprised of tuples that are created in a similar manner to the test tuples. Specifically, for a given training session $s_i$, the training session data may be set to $I_i=\{(k, j): k, j\in\{0 \ldots L_i\} \wedge 2 \le k-j \le d \wedge A(a_{i,k})=P \wedge A(a_{i,j})=C\}$. The CP model represents a series of click events that result in a purchase event. As a result, in this model, U and V are the representations of the clicks and purchases, respectively.

The second model may be used to model the sequential click actions without a purchase action. The reasoning behind this model is the fact that each purchase event is preceded by a click on the same item that was purchased. Hence, by predicting the next item upon which the user will click, a prediction of the next item that would be purchased may be generated. Therefore, in this model the training session data may be set to $I_i=\{(k,j): k, j \in \{0 \ldots L_i\} \wedge 1 \leq k-j \leq d \wedge A(a_{i,k})=C \wedge A(a_{i,j})=C\}$.

The third model may be used to model sequential purchase actions (without intervening click actions). Many collaborative filtering algorithms are designed to predict the next item a user will purchase, given the items he already purchased. In the 'PP' model the training session data may be set to $I_i=\{(k, j): k, j \in \{0 \ldots L_i\} \wedge 1 \leq k-j \leq d \wedge A(a_{i,k})=P \wedge A(a_{i,j})=P\}$.

Models may be generated by the model generator 110 that are associated with a specific device. For example, different models may be generated for each client device 102A, 102B, and 102C based upon a set of training data derived specifically from the actions of the individual devices. In such examples, different models may be generated for specific devices and/or users. Alternatively, or additionally, model generator 110 may generate a model based upon a larger set of usage data. In said example, session data from multiple devices, such as client devices 102A, 102B, and 102C, may be used to generate one or more models. As such, in examples models may be generated based upon a group of users or the entire user base rather than generate models for specific users.

The one or more models generated by the model generator 110 may be used to provide real-time recommendations when a client device, such as client device 102A, is browsing the online marketplace 106A. A recommendation provider 112 may receive one or more models from a model generator 110. The recommendation provider may also receive actions submitted to the online marketplace 106 from a client device, such as client device 102A, in real-time. In one example, a single action is received by the recommendation provider 112. Alternatively, or additionally, a sequence of actions may be received by the recommendation provider in real-time. The one or more events received by the recommendation provider 112 may be provided to a model in order to predict the next likely action. The model that the one or more clicks are provided to may be based upon the type actions in a sequence. For example, if the sequence is a series of click actions with no purchase, it may be provided to a model that for predicting the next purchase action based upon the series of clicks and/or a model for predicting the next click action based upon the series of clicks. As another example, if the last action received is a purchase action, the action may be provided to a model to predict the next purchase based upon a previous purchase. The output of the one or more models may identify one or more actions. The one or more actions may then be provided, by the recommendation provider 112, to the client device that submitted the action, as a recommendation.

While system 100 depicts three different client devices, client device 102A, client device 102B, and client device 102C, interacting with the online marketplace 106, on of skill of the art will appreciate that more or fewer client devices may interact with the online marketplace 106 without departing from the scope of this disclosure. Additionally, while the online marketplace 106, sequence tracker 108, model generator 110, and recommendation provider 112 are illustrated as being separate entities, each entity may be executed on a single server. Alternatively, the different entities may be hosted or executed on a distributed network 104 that comprises a plurality of different server devices.

Figure 2:
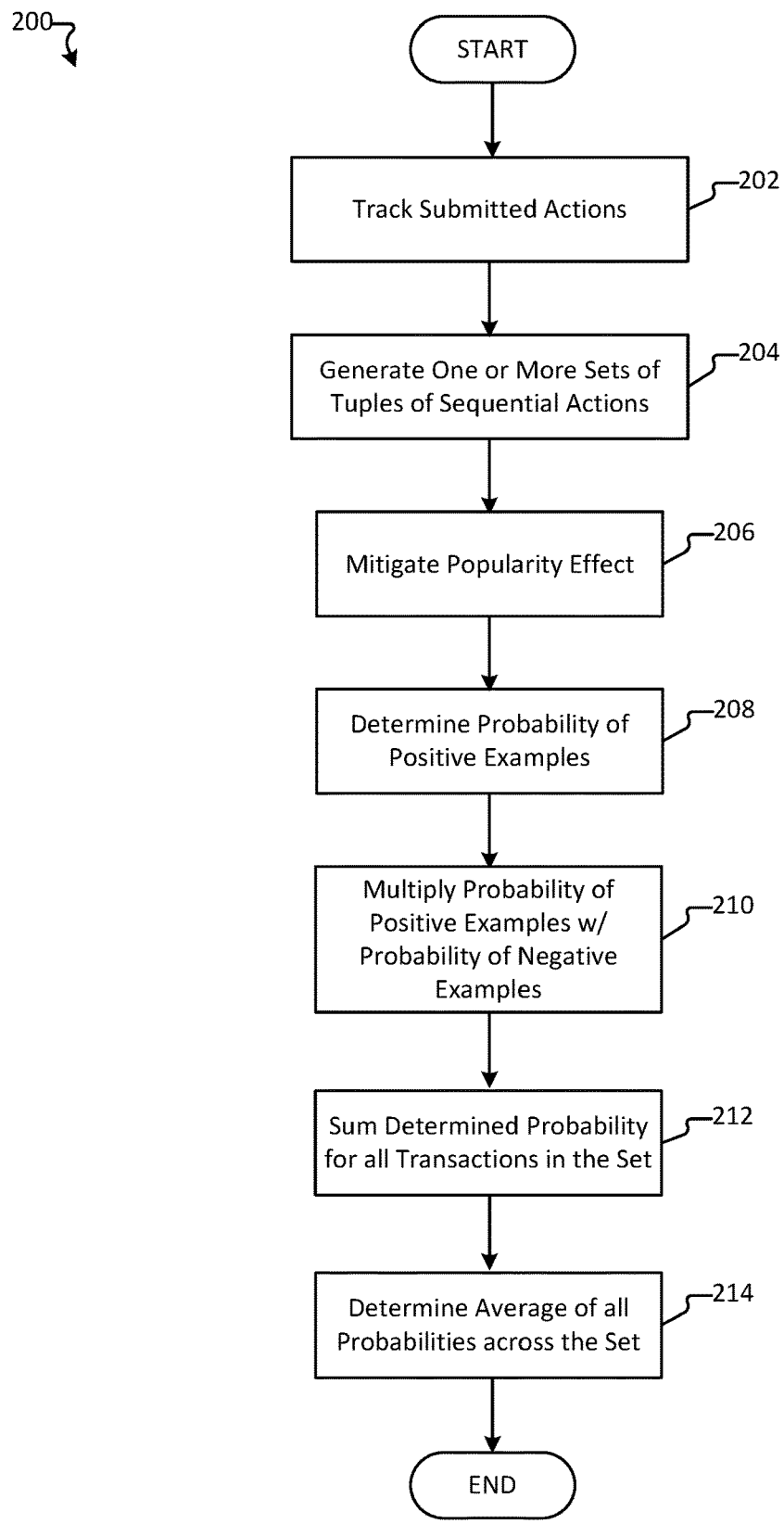
FIG. 2 depicts an exemplary method 200 for modeling a sequence of actions

Having described a system for providing recommendation based upon action received at an online marketplace, the disclosure will now provide an exemplary method for building a model to represent the actions. FIG. 2 depicts an exemplary method 200 for modeling a sequence of actions. In aspects, method 200 may be executed by an exemplary system such as system 100 of FIG. 1. In examples, method 200 may be executed on a device comprising at least one processor configured to store and execute operations, programs or instructions. However, method 200 is not limited to such examples. In other examples, method 200 may be performed on an application or service for providing automatic inline detection. In at least one example, method 200 may be executed (e.g., computer-implemented operations) by one or more components of a distributed network, such as a web service/distributed network service (e.g. cloud service). In one example, the method 200 may be used to model a sequence of click and/or purchase actions submitted to an online marketplace.

Flow begins at operation 202 where one or more submitted actions are tracked. As previously discussed, the tracked actions may be click actions, that is, an action comprising a user clicking or otherwise selecting an item, such as a content item from an online marketplace. The traced actions may also include a purchase action which indicates a purchase of an item, such as a content item from an online marketplace. The actions may be tracked for an individual device or user or for a group of devices or users. Flow continues to operation 204 where the tracked actions are used to generate one or more sets of tuples of sequential actions. For example, the set $\{C1, C2, C3, C4, C5, P5\}$ which represents five click event on five different items followed by a single purchase event is an exemplary tuple of sequential actions. In alternate aspects, rather than generating the tuples of sequential actions at operation 204, an existing tuple may be received. In one example, the operation 202 and 204 may be performed by a sequence tracer, such as sequence tracker 108 of FIG. 1.

Flow continues to operation 206 where the tuple data may be processed to mitigate popularity effects. A popularity effect may result in an overrepresented sequence of actions. For example, if a new item is released, actions for the newly released item may be overrepresented due to the newness of the item. The overrepresentation may have a negative effect on the accuracy of the model and/or recommendations provided by the model. As such, the tuples of sequential actions may be subsampled at operation 206 in order to generate a more representative sample. In one example, in order to account for the popularity effect, the tuples of sequential actions may be subsampled to provide a proper representation over a period of time. In various aspects, actions a with the probability $p(discard|a)=1-\sqrt{\rho/f(y(a))}$ may be discarded, where y(a) is the item that is associated with the action a, f(x) is the frequency of the item x and $\rho$ is a parameter that controls how aggressive is the subsampling.

Flow continues to operation 208 where probabilities of positive and negative examples are determined. In one example, a positive example is a tuple sequence that includes or terminates with a desired action. That is, a specific purchase action or click action may be desired. A positive example represents one or more transactions, that is, sequences of actions, that did occur in the sets of tuples received or generated at operation 204. A negative example represents transactions, that is sequences of actions, that did not occur in the set of tuples received or generated at operation 204. Upon determining the probability of positive and negative examples, the determined probabilities for positive and negative examples are multiplied at operation 210 in order to generate a probability for a particular tuple (or sequence of actions). As previously discussed, in one example, the probability $p(a_{i,k}|a_{i,j})$ for a particular tuple is defined by:

$$p(a_{i,k} | a_{i,j}) = \sigma(u_{a_{i,j}}^T v_{a_{i,k}}) \prod_{n=1}^{N} \sigma(-u_{a_{i,j}}^T v_{a_n})$$

In the probability equation $\sigma(x)=1/1+\exp(-x)$, and $u_a \in U(\subset \mathbb{R}^m)$ and $v_a \in V(\subset \mathbb{R}^m)$ are latent vectors corresponding to the target and context representation of action a. The parameter m is chosen empirically through cross-validation. N is a parameter that determines the number of negative examples to be drawn per a positive example. A negative action a is sampled from a distribution that is proportional to the frequency of the item that is associated with a. A unigram distribution raised to the ¾rd power may be employed in order to provide better results.

Operation 210 may be repeated to determine a probability for each tuple represented in the set received or generated at operation 204. Upon determining the probabilities for the different tuples in the set of tuples, the probabilities for the tuples across the set may be summed at operation 212 and averaged at operation 214. As previously, discussed, probabilities for each tuple in the set may be summed in operation 212 and the resulting sum may be divided by the number represented tuples to produce an average in operation 214. In one example, the following formula may be applied to determine an average probability across the set:

$$\frac{1}{K} \sum_{i=1}^{K} \sum_{(k,j) \in I_i} \log p(a_{i,k} | a_{i,j}) \qquad (1)$$

In the above equation, $I_i \subseteq \{(k,j): 0 \leq j<k \leq L_i\}$ is a set that contains (target, context) tuples of sequential actions. The type of the model generated by the method 200 may differ depending on the types of tuples represented in the set of tuples generated or received at operation 204. As such, different types of models may result based upon the selected tuples. In examples, the tuples may be selected to generate a click to purchase model, a click to click model, or a purchase to purchase model.

Figure 3:
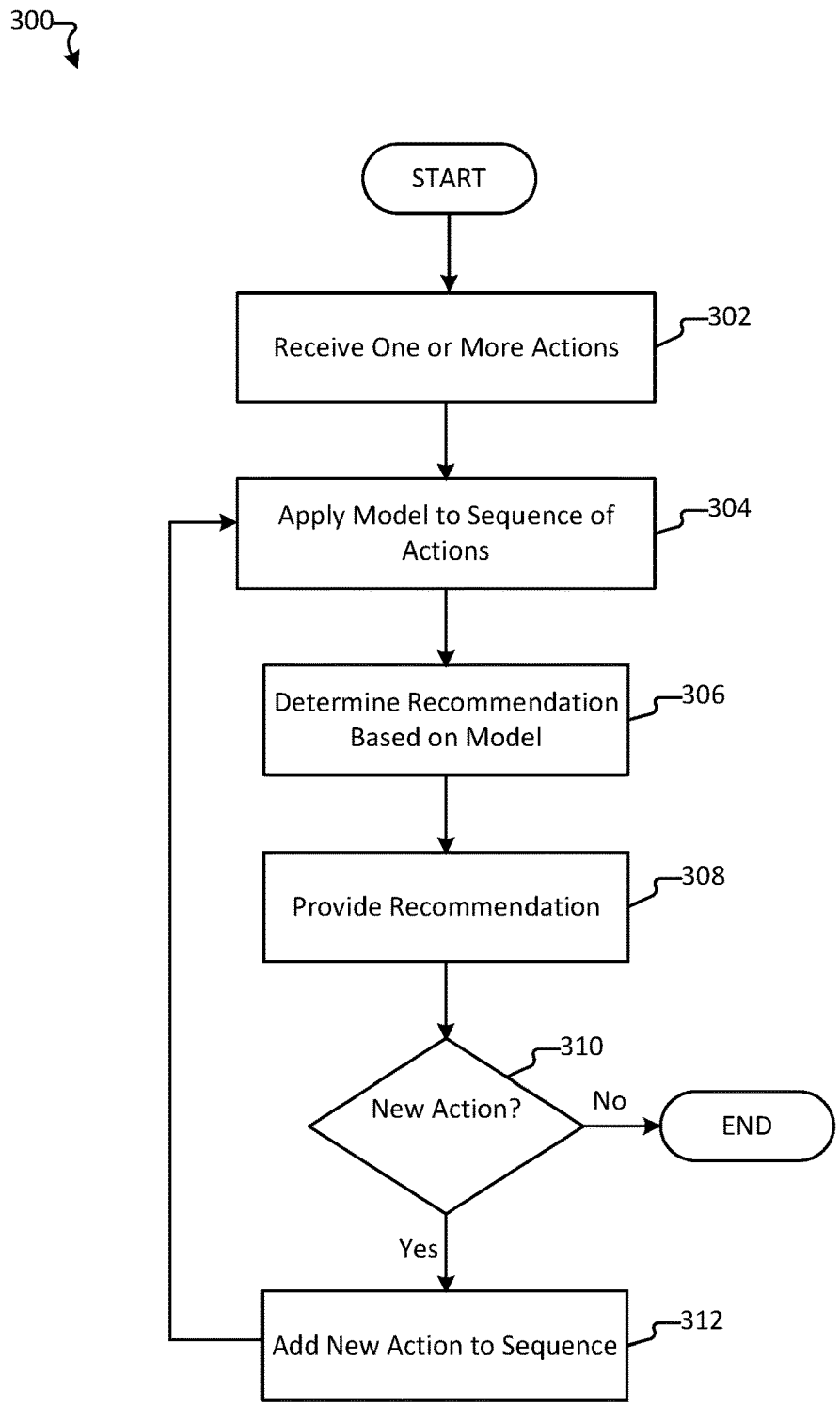
FIG. 3 is an exemplary method for providing a recommendation based upon a sequence of actions received at an online marketplace.

FIG. 3 is an exemplary method for providing a recommendation based upon a sequence of actions received at an online marketplace. In one example, the recommendations are based upon models generated using the item2vec algorithm disclosed herein. In aspects, method 300 may be executed by an exemplary system such as system 100 of FIG. 1. In examples, method 300 may be executed on a device comprising at least one processor configured to store and execute operations, programs or instructions. However, method 300 is not limited to such examples. In other examples, method 300 may be performed on an application or service for providing automatic inline detection. In at least one example, method 300 may be executed (e.g., computer-implemented operations) by one or more components of a distributed network, such as a web service/distributed network service (e.g. cloud service).

Flow begins at operation 302 where an action or a sequence of actions are received. As previously discussed, in one example, an action may be a click action or a purchase action. Upon receiving the action, or sequence of actions, flow continues to operation 304. At operation 304. A model is applied to the one or more actions received at operation 302. In one example, the type of model applied may depend upon the action or sequence of action received at operation 304 (or the resulting sequence after a new action is received at operation 312). As such, operation 304 may include evaluating the action or sequence of action to determine which type of model to apply. For example, if the action or sequence is a click action, a model to determine a purchase action and/or a model to determine a next click action may be utilized at operation 304. Alternatively, if the action is a purchase action or a sequence that ends in a purchase action, then a model to determine a next purchase action may be applied.

Flow continues to operation 306 where the results of applying the model to the sequence of actions are processed to generate a recommendation. In example, the model may generate a number of next actions that may be performed based upon the received action or sequence of actions. In one example, each of the next actions may be determined as a recommendation. Alternatively, additional processing may be performed to determine a recommendation. For example, a threshold of probability may be compared against the actions generated by the model. Only actions that have a probability higher than the threshold may be selected as recommendation. In still further aspects, only the action with the highest probability may be determined as a recommendation at operation 306. Once the one or more recommendations are determined, flow continues to operation 308 where the one or more recommendations are provided. In one example, providing the one or more recommendations may include displaying the one or more recommendations. In an alternate example, providing the one or more recommendations may include sending the one or more recommendations to a remote device, such as a client device. In still further examples, the one or more recommendations may be saved for later use at operation 308.

Flow continues to operation 310 where a determination is made as to whether a new action is received. For example, upon providing the recommendation, a new action may be received at the online marketplace. The new action may be selection of the recommendation, selection of another item, or purchase of an item in the online marketplace. If no further action is received, flow branches NO and the method 300 terminates. If, however, a new action is received, flow branches YES to operation 312. At operation 312, the newly received action is added to the sequence of actions and flow returns to operation 304. This allows the method 300 to continually provide recommendations as a user navigates and/or purchases items from an online marketplace. The method 300 may continue to provide recommendations as long as new actions are received.

FIGS. 4-7 and the associated descriptions provide a discussion of a variety of operating environments in which aspects of the disclosure may be practiced. However, the devices and systems illustrated and discussed with respect to FIGS. 4-13 are for purposes of example and illustration and are not limiting of a vast number of computing device configurations that may be utilized for practicing aspects of the disclosure, as described herein.

Figure 4:
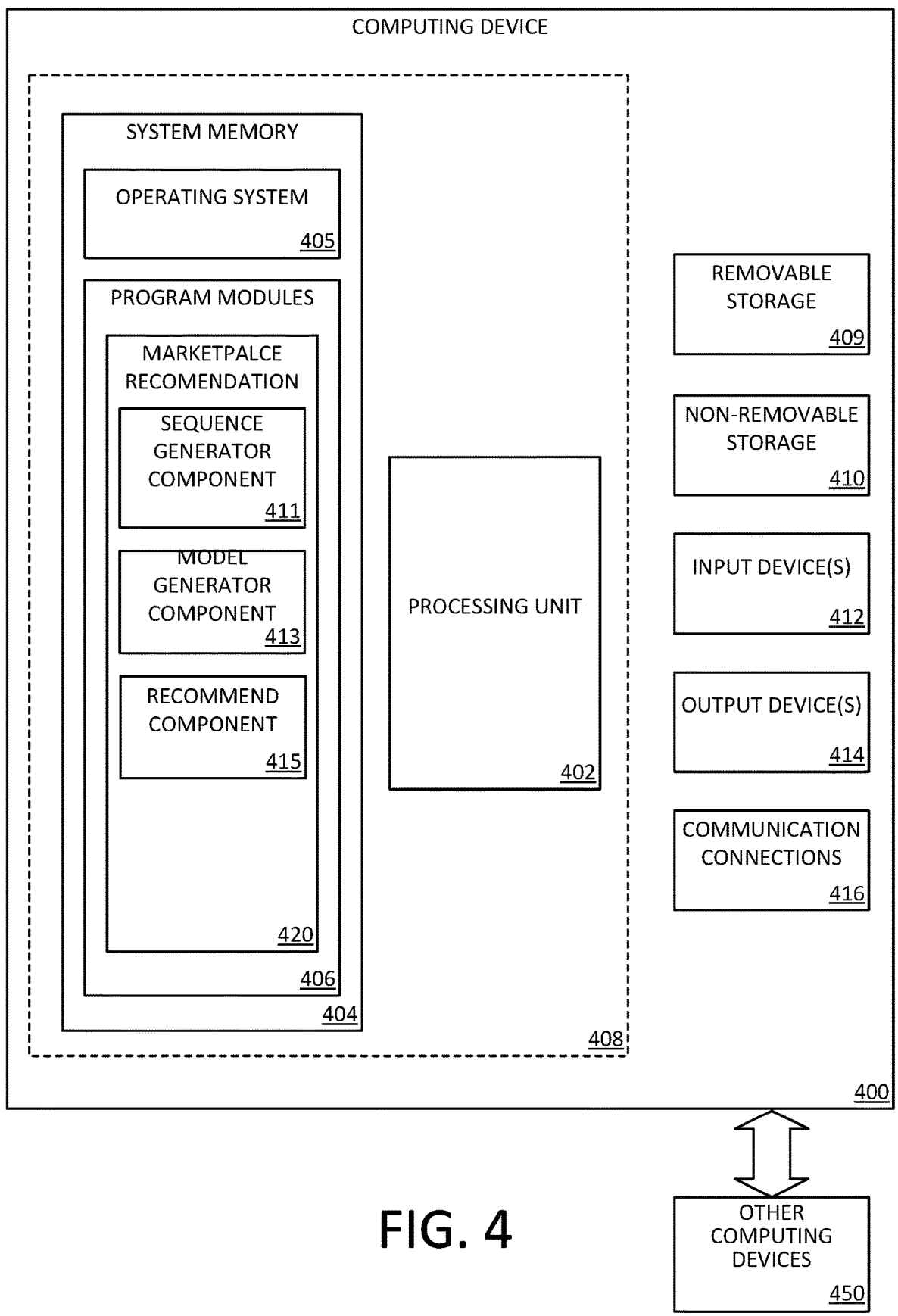
FIG. 4 is a block diagram illustrating example physical components of a computing device with which aspects of the disclosure may be practiced.

FIG. 4 is a block diagram illustrating physical components (e.g., hardware) of a computing device 400 with which aspects of the disclosure may be practiced. The computing device components described below may have computer executable instructions for implementing an online marketplace recommendation application 420 on a computing device (e.g., a server computing device and/or client computing device), including computer executable instructions for online marketplace recommendation application 420 that can be executed to implement the methods disclosed herein. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more program modules 406 suitable for running online marketplace recommendation application 420, such as one or more components with regard to FIG. 1 and, in particular, sequence generator 411, model generator 413, and/or recommendation component 415.

The operating system 405, for example, may be suitable for controlling the operation of the computing device 400. Furthermore, embodiments of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 (e.g., collaboration application 420) may perform processes including, but not limited to, the aspects, as described herein. Other program modules that may be used in accordance with aspects of the present disclosure, and in particular for generating models for online recommendation, may include sequence generator 411, model generator 413, and/or recommendation component 415, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 400 may also have one or more input device(s) 412 such as a keyboard, a mouse, a pen, a sound or voice input device, a touch or swipe input device, etc. The output device(s) 414 such as a display, speakers, a printer, etc. may also be included. The aforementioned devices are examples and others may be used. The computing device 400 may include one or more communication connections 416 allowing communications with other computing devices 450. Examples of suitable communication connections 416 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media may be non-transitory media that does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 5A:
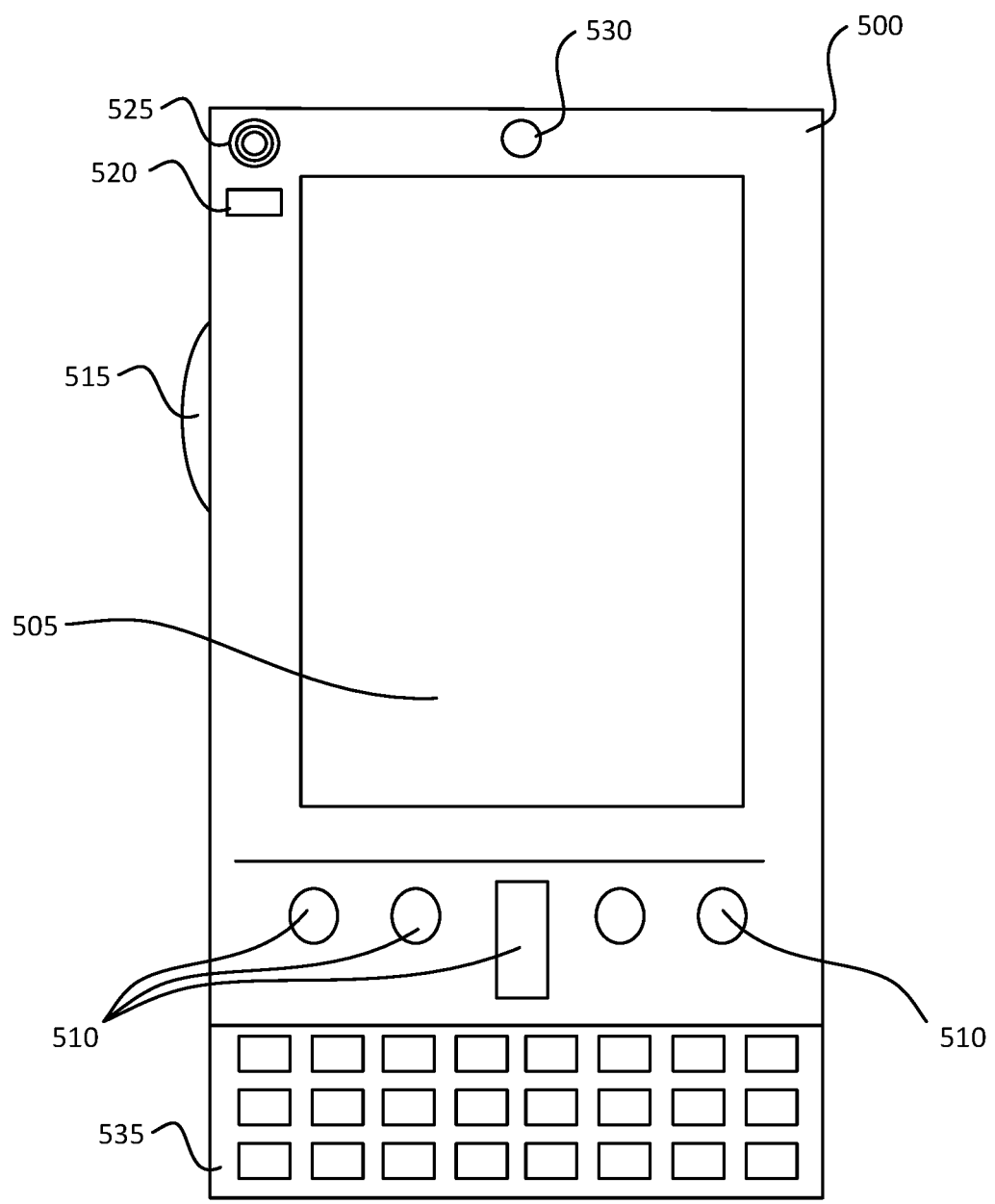
FIGS. 5A and 5B are simplified block diagrams of a mobile computing device with which aspects of the present disclosure may be practiced.
Figure 5B:
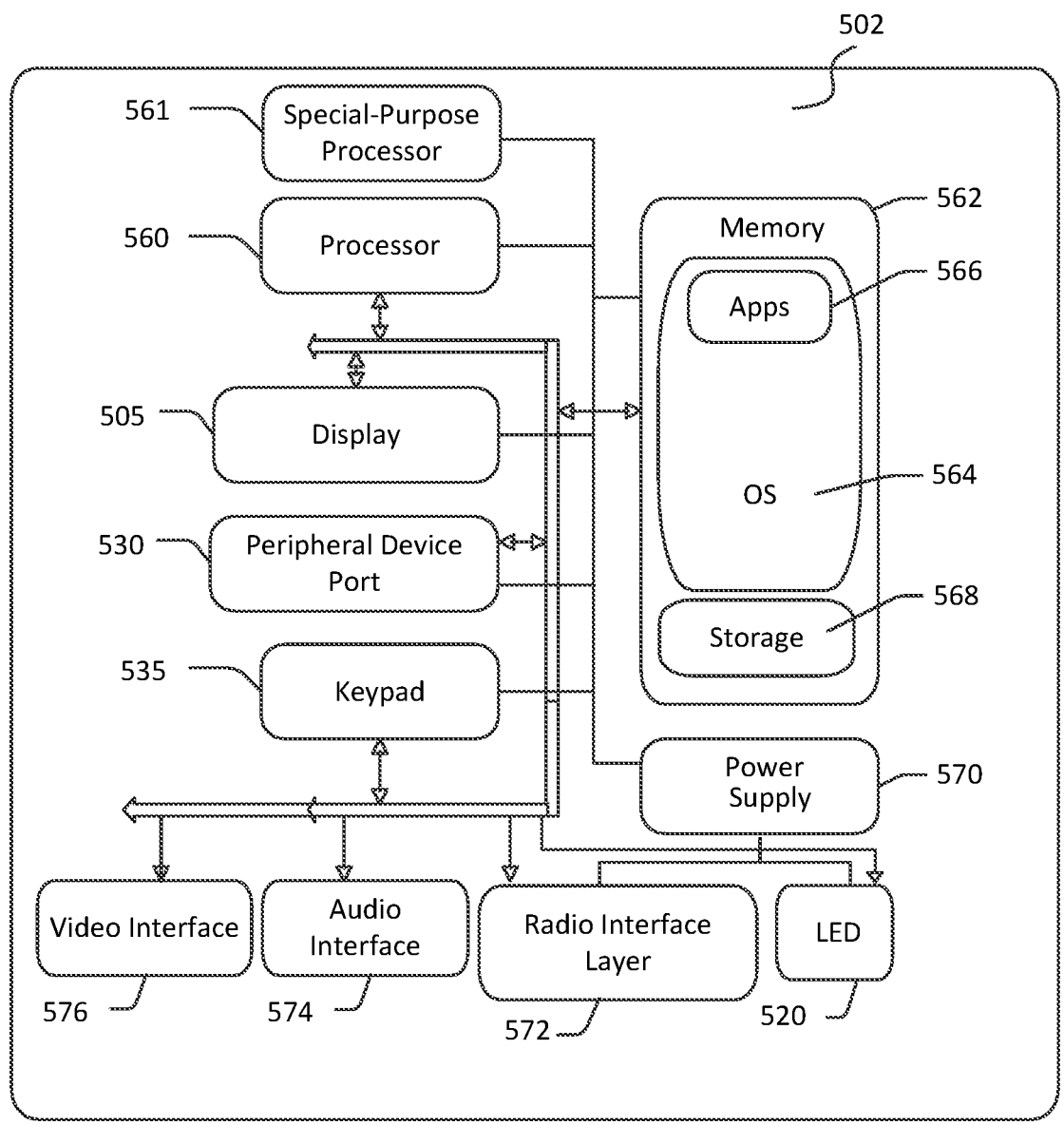

FIGS. 5A and 5B illustrate a mobile computing device 500, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 5A, one aspect of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative aspects, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some aspects, the mobile computing device 500 incorporates a vibration transducer for providing the user with tactile feedback. In yet another aspect, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one aspect of a mobile computing device. That is, the mobile computing device 500 can incorporate a system (e.g., an architecture) 502 to implement some aspects. In one embodiment, the system 502 is implemented as a "smart phone" capable of running one or more applications (e.g., browser, e-mail, calendaring, contact managers, messaging clients, games, and media clients/players). In some aspects, the system 502 is integrated as a computing device, such as an integrated personal digital assistant (PDA) and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as email or other messages used by an email application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500, including the instructions for creating and sharing collaborative objects as described herein (e.g., task component, communication component, task product component, collaborative object component, permissions component, and/or UX component, etc.).

The system 502 has a power supply 570, which may be implemented as one or more batteries. The power supply 570 may further include an external power source, such as an AC adapter or a powered docking cradle that supplements or recharges the batteries. The system 502 may also include a radio interface layer 572 that performs the function of transmitting and receiving radio frequency communications. The radio interface layer 572 facilitates wireless connectivity between the system 502 and the "outside world," via a communications carrier or service provider. Transmissions to and from the radio interface layer 572 are conducted under control of the operating system 564. In other words, communications received by the radio interface layer 572 may be disseminated to the application programs 566 via the operating system 564, and vice versa.

The visual indicator 520 may be used to provide visual notifications, and/or an audio interface 574 may be used for producing audible notifications via an audio transducer 525 (e.g., audio transducer 525 illustrated in FIG. 5A). In the illustrated embodiment, the visual indicator 520 is a light emitting diode (LED) and the audio transducer 525 may be a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present disclosure, the microphone may also serve as an audio sensor to facilitate control of notifications, as will be described below. The system 502 may further include a video interface 576 that enables an operation of peripheral device 530 (e.g., on-board camera) to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio interface layer 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio interface layer 572 or via a distributed computing network. Similarly, such data/information may be readily transferred between computing devices for storage and use according to well-known data/information transfer and storage means, including electronic mail and collaborative data/information sharing systems.

As should be appreciated, FIGS. 5A and 5B are described for purposes of illustrating the present methods and systems and are not intended to limit the disclosure to a particular sequence of steps or a particular combination of hardware or software components.

Figure 6:
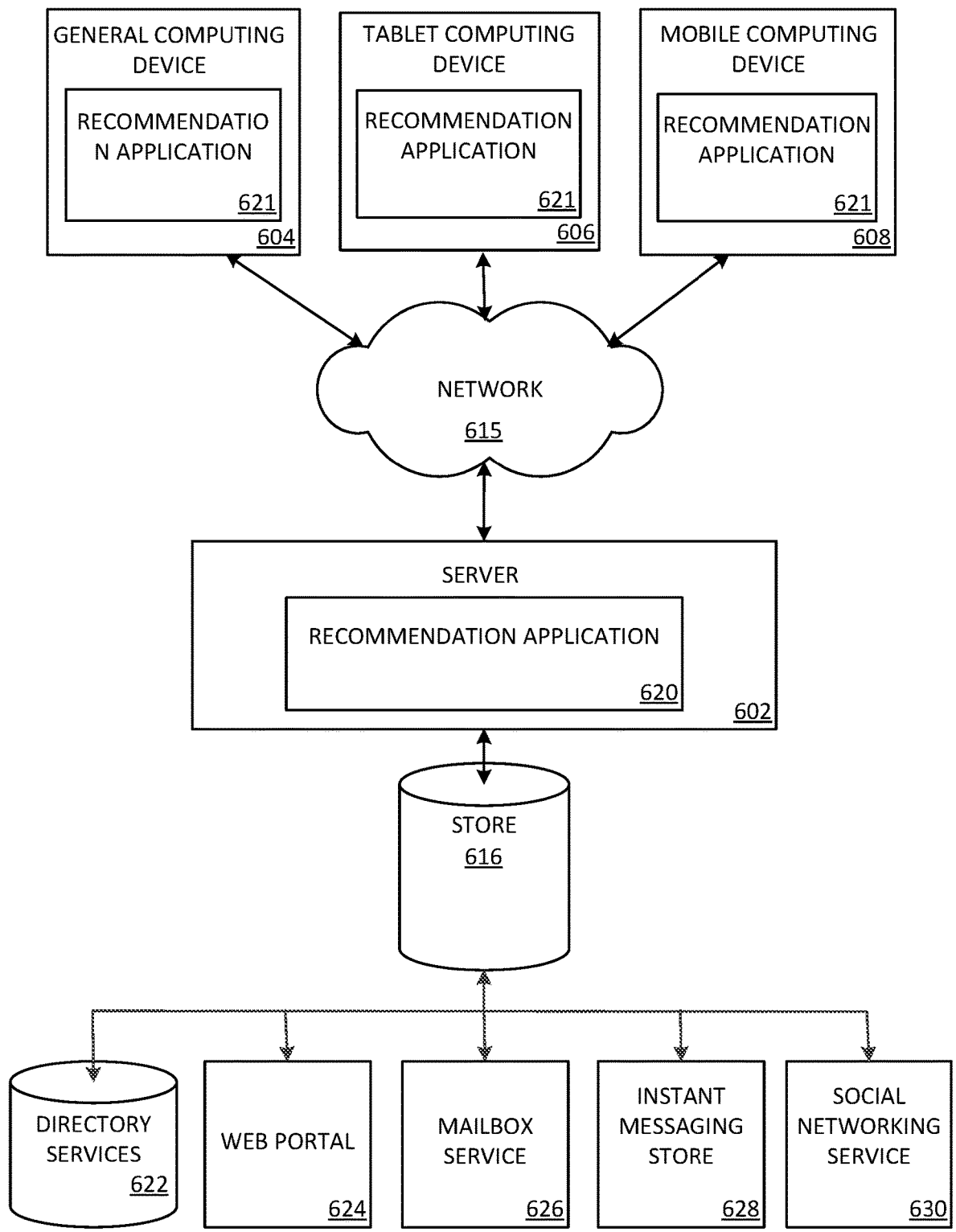
FIG. 6 is a simplified block diagram of a distributed computing system in which aspects of the present disclosure may be practiced.

FIG. 6 illustrates one aspect of the architecture of a system for processing data received at a computing system from a remote source, such as a general computing device 604 (e.g., personal computer), tablet computing device 606, or mobile computing device 608, as described above. Content displayed at server device 602 may be stored in different communication channels or other storage types. For example, various documents may be stored using a directory service 622, a web portal 624, a mailbox service 626, an instant messaging store 628, or a social networking service 630. The recommendation application 621 may be employed by a client that communicates with server device 602, and/or the recommendation application 620 may be employed by server device 602. The server device 602 may provide data to and from a client computing device such as a general computing device 604, a tablet computing device 606 and/or a mobile computing device 608 (e.g., a smart phone) through a network 615. By way of example, the computer system described above with respect to FIGS. 1-11 may be embodied in a general computing device 604 (e.g., personal computer), a tablet computing device 606 and/or a mobile computing device 608 (e.g., a smart phone). Any of these embodiments of the computing devices may obtain content from the store 616, in addition to receiving graphical data useable to either be pre-processed at a graphic-originating system or post-processed at a receiving computing system.

As should be appreciated, FIG. 6 is described for purposes of illustrating the present methods and systems and is not intended to limit the disclosure to a particular sequence of steps or a particular combination of hardware or software components.

Figure 7:
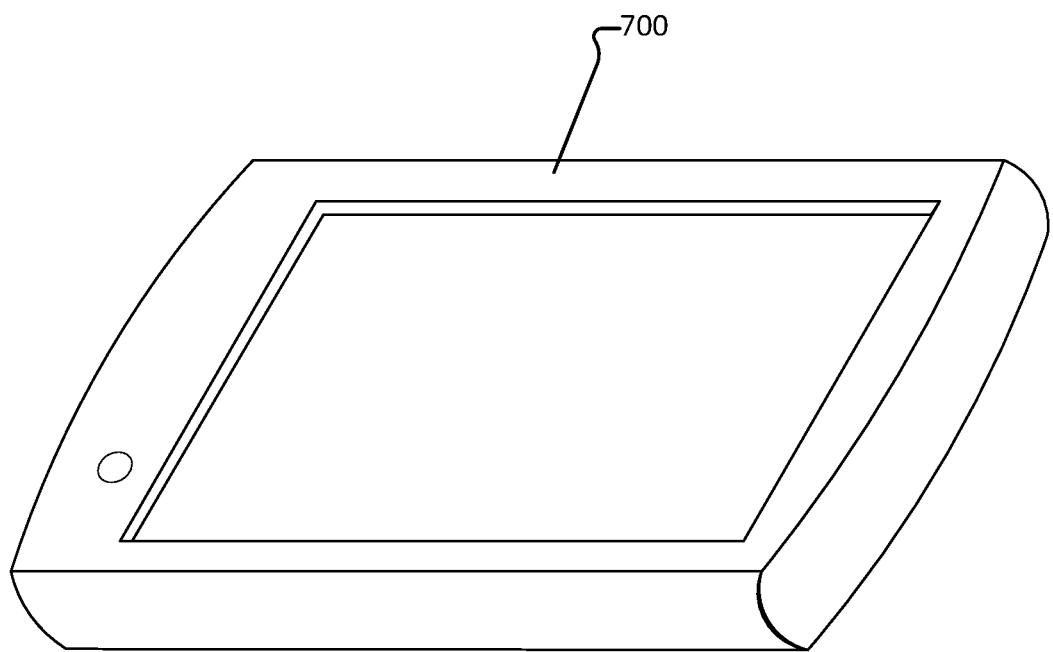
FIG. 7 illustrates a tablet computing device for executing one or more aspects of the present disclosure.

FIG. 7 illustrates an exemplary tablet computing device 7 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 7 is described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processing unit; and
   at least one memory storing computer executable instructions that, when executed by the at least one processing unit, perform a method for generating a model for a sequence of user actions, the method comprising:
      tracking user actions submitted via a plurality of client devices that are directed to an online marketplace hosted at a server system;
      for each client device of the plurality of client devices, generate a tuple or the client device by grouping a subset of the user actions that are associated with the client device into a sequence of multiple user actions to obtain a plurality of tuples;
      mitigating an effect of higher probability user actions in one or more tuples generated for the plurality of client devices of by subsampling the plurality of tuples, including discarding one or more user actions of the one or more tuples of a threshold probability;
      determining a probability of each tuple of user actions in the plurality of tuples of user actions following mitigating the effect of higher probability user actions;
      summing the probability determined for each tuple in the plurality of tuples;
      determining an average for the summed probabilities of the plurality of tuples to generate the model;
      during a session of a subject client device with the online marketplace:
      tracking user actions of the subject client device that are directed to the online marketplace to obtain a sequence of user actions;
      generating a recommendation for a next action for the subject client device based on the model and the sequence of user actions of the subject client device;
      outputting a recommendation to the subject client device;
      receive a new user action from the subject client device directed to the online marketplace;
      adding the new user action to the sequence of user actions of the subject client device to obtain an updated sequence of user actions of the subject client device;
      generating a subsequent recommendation for a subsequent next action for the subject client device based on the model and the updated sequence of user actions of the subject client device; and
      outputting the subsequent recommendation to the subject client device.

2. The system of claim 1, wherein the model represents a series of click actions followed by a purchase action, and wherein the plurality of tuples comprises individual tuples having one or more click actions and a single purchase action.

3. The system of claim 1, wherein the model represents a series of click actions, and wherein the plurality of tuples comprises individual tuples having only click actions.

4. The system of claim 1, wherein the model represents sequential purchase actions, and wherein the plurality of tuples comprises individual tuples having two or more purchase actions.

5. The system of claim 1, wherein subsampling the plurality of tuples comprises discarding user actions having a probability of $p(\text{discard}|a)=1-\sqrt{\rho/f(y(a))}$.

6. A method for generating a model for a sequence of user actions, the method comprising:
- tracking by at least one server of a server system user actions submitted via a plurality of client devices that are directed to an online marketplace hosted at the server system;
- for each client device of the plurality of client devices, generate a tuple for the client device by grouping a subset of the user actions that are associated with the client device into a sequence of multiple user actions to obtain a plurality of tuples;
- mitigating by the at least one server an effect of higher probability user actions in one or more tuples generated for the plurality of client devices by subsampling the plurality of tuples, including discarding one or more user actions of the one or more tuples of a threshold probability;
- determining a probability of each tuple of user actions in the plurality of tuples of user actions following mitigating the effect of higher probability user actions;
- summing the probability determined for each tuple in the plurality of tuples; and
  - determining an average for the summed probabilities of the plurality of tuples to generate the model;
- during a session of a subject client device with the online marketplace:
  - tracking by the at least one server user actions of the subject client device that are directed to the online marketplace to obtain a sequence of user actions;
  - generating a recommendation for a next action for the subject client device based on the model and the sequence of user actions of the subject client device;
  - outputting by the at least one server a recommendation to the subject client device;
  - receiving a new user action from the subject client device directed to the online marketplace;
  - add the new user action to the sequence of user actions of the subject client device to obtain an updated sequence of user actions of the subject client device;
  - generating a subsequent recommendation for a subsequent next action for the subject client device based on the model and the updated sequence of user actions of the subject client device; and
  - outputting by the at least one server the subsequent recommendation to the subject client device.

7. The method of claim 6, wherein the model represents a series of click actions followed by a purchase action, and wherein the plurality of tuples comprises individual tuples having one or more click actions and a single purchase action.

8. The method of claim 6, wherein the model represents a series of click actions, and wherein the plurality of tuples comprises individual tuples having only click actions.

9. The method of claim 6, wherein the model represents sequential purchase actions, and wherein the plurality of tuples comprises individual tuples having two or more purchase actions.

10. The method of claim 6, wherein generating the recommendation comprises selecting a recommendation with the highest probability from a plurality of recommendations.

11. The method of claim 6, wherein generating the recommendation comprises selecting one or more recommendations from a plurality of recommendations, wherein the one or more selected recommendations are associated with a probability greater than a predetermined threshold probability.

12. A computer storage media device encoding computer executable instruction that, when executed by at least one processor, perform a method comprising:
- tracking by the at least one processor user actions submitted via a plurality of client devices that are directed to an online marketplace hosted at a server system;
- for each client device of the plurality of client devices, generate a tuple for the client device by grouping a subset of the user actions that are associated with the client device into a sequence of multiple user actions to obtain a plurality of tuples;
- mitigating by the at least one processor an effect of higher probability user actions in the one or more tuples generated for the plurality of client devices by subsampling the plurality of tuples, including discarding one or more user actions of the one or more tuples of a threshold probability;
- determining a probability for each tuple of user actions in the plurality of tuples of user actions following mitigating the effect of higher probability user actions;
- summing the probability determined for each tuple in the plurality of tuples;
- determining an average for the summed probabilities of the plurality of tuples to generate a model;
- during a session of a subject client device with the online marketplace:
  - tracking by the at least one processor user actions of the subject client device that are directed to the online marketplace to obtain a sequence of user actions;
  - generating a recommendation for a next action for the subject client device based on the model and the sequence of user actions of the subject client device;
  - outputting by the at least one processor a recommendation to the subject client device;
  - receiving a new user action from the subject client device directed to the online marketplace;
  - add the new user action to the sequence of user actions of the subject client device to obtain an updated sequence of user actions of the subject client device;
  - generating a subsequent recommendation for a subsequent next action for the subject client device based on the model and the updated sequence of user actions of the subject client device; and
  - outputting by the at least one processor the subsequent recommendation to the subject client device.

\* \* \* \* \*